US009780965B2

(12) United States Patent
Huynh Van et al.

(10) Patent No.: US 9,780,965 B2
(45) Date of Patent: *Oct. 3, 2017

(54) METHODS AND SYSTEMS FOR COMMUNICATING USING A VIRTUAL PRIVATE NETWORK

(71) Applicant: GLUE NETWORKS, Sacramento, CA (US)

(72) Inventors: Olivier Huynh Van, Paris (FR); Jeffrey G. Gray, Sacramento, CA (US)

(73) Assignee: GLUE NETWORKS, Sacramento, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/325,757

(22) Filed: Jul. 8, 2014

(65) Prior Publication Data

US 2015/0010008 A1    Jan. 8, 2015

Related U.S. Application Data

(63) Continuation of application No. 12/471,199, filed on May 22, 2009, now Pat. No. 8,837,491.

(60) Provisional application No. 61/056,268, filed on May 27, 2008.

(51) Int. Cl.
*H04L 12/46* (2006.01)
*H04L 12/701* (2013.01)
*H04L 12/715* (2013.01)
*H04L 9/30* (2006.01)
*H04L 12/54* (2013.01)

(52) U.S. Cl.
CPC ............ *H04L 12/4641* (2013.01); *H04L 9/30* (2013.01); *H04L 12/56* (2013.01); *H04L 45/00* (2013.01); *H04L 45/64* (2013.01)

(58) Field of Classification Search
CPC .................................................. H04L 12/56
USPC ..................................................... 370/395.31
See application file for complete search history.

(56) References Cited

U.S. PATENT DOCUMENTS

| | | | |
|---|---|---|---|
| 5,594,792 A | 1/1997 | Chouraki et al. |
| 6,061,721 A | 5/2000 | Ismael et al. |
| 6,105,131 A | 8/2000 | Carroll |
| 6,175,917 B1 | 1/2001 | Arrow |
| 6,286,038 B1 | 9/2001 | Reichmeyer et al. |
| 6,335,926 B1 | 1/2002 | Silton |
| 6,438,690 B1 | 8/2002 | Patel et al. |
| 6,513,159 B1 | 1/2003 | Dodson |
| 6,571,285 B1 | 5/2003 | Groath et al. |

(Continued)

FOREIGN PATENT DOCUMENTS

| | | |
|---|---|---|
| CN | 102315971 | 1/2012 |
| JP | 2000-209239 | 7/2000 |

(Continued)

OTHER PUBLICATIONS

International Search Report issued in International Application No. PCT/US2009/045155, mailed Jul. 6, 2009.

(Continued)

*Primary Examiner* — Edan Orgad
*Assistant Examiner* — Nourali Mansoury
(74) *Attorney, Agent, or Firm* — DLA Pipers LLP US

(57) ABSTRACT

Systems and methods for communication. A network abstraction layer (NAL) is built on a public Internet; and a network virtualization layer (NVL) is built on the NAL.

10 Claims, 14 Drawing Sheets

(56) References Cited

U.S. PATENT DOCUMENTS

| | | | |
|---|---|---|---|
| 6,640,251 B1 | 10/2003 | Wiget et al. |
| 6,715,073 B1 | 3/2004 | An et al. |
| 6,826,611 B1 | 11/2004 | Arndt |
| 6,879,679 B1 | 4/2005 | Ong |
| 6,892,300 B2 | 5/2005 | Carroll et al. |
| 6,931,526 B1 | 8/2005 | Bacha et al. |
| 6,966,060 B1 | 11/2005 | Young et al. |
| 7,054,924 B1 | 5/2006 | Harvey et al. |
| 7,075,933 B2 | 7/2006 | Aysan |
| 7,305,479 B1 | 12/2007 | Morris et al. |
| 7,352,853 B1 | 4/2008 | Shen et al. |
| 7,373,661 B2 | 5/2008 | Smith et al. |
| 7,376,653 B2 | 5/2008 | Hart |
| 7,397,911 B2 | 7/2008 | Shen et al. |
| 7,409,709 B2 | 8/2008 | Smith et al. |
| 7,411,955 B2 | 8/2008 | Li et al. |
| 7,420,933 B2 | 9/2008 | Booth, III et al. |
| 7,447,901 B1 | 11/2008 | Sullenberger |
| 7,535,856 B2 | 5/2009 | Booth, III et al. |
| 7,558,847 B2 | 7/2009 | Strassner |
| 7,593,352 B2 | 9/2009 | Verma |
| 7,600,011 B1 | 10/2009 | Urbanek |
| 7,602,737 B2 | 10/2009 | Asati et al. |
| 7,636,771 B2 | 12/2009 | Torii |
| 7,643,434 B2 | 1/2010 | Mandavilli et al. |
| 7,660,265 B2 | 2/2010 | Kreuk |
| 7,801,030 B1 | 9/2010 | Aggarwal et al. |
| 7,869,436 B1 | 1/2011 | Adler et al. |
| 7,940,916 B2 | 5/2011 | Baker et al. |
| 8,041,786 B2 | 10/2011 | Tindal et al. |
| 8,055,891 B2 | 11/2011 | Haustein et al. |
| 8,140,642 B1 | 3/2012 | Kadam et al. |
| 8,370,933 B1 | 2/2013 | Buckler |
| 8,693,371 B2 | 4/2014 | Duggan et al. |
| 8,701,078 B1 | 4/2014 | Holler et al. |
| 8,782,182 B2 | 7/2014 | Chaturvedi et al. |
| 8,819,202 B1 | 8/2014 | Carolan et al. |
| 8,849,973 B2 | 9/2014 | Leib et al. |
| 8,869,236 B1 | 10/2014 | Tonogai et al. |
| 9,037,969 B2 | 5/2015 | Wolff-Petersen et al. |
| 9,038,151 B1 | 5/2015 | Chua et al. |
| 9,178,807 B1 | 11/2015 | Chua et al. |
| 9,264,301 B1 | 2/2016 | Chua et al. |
| 9,276,877 B1 | 3/2016 | Chua et al. |
| 9,407,541 B2 | 8/2016 | Barabash et al. |
| 9,450,817 B1 | 9/2016 | Bahadur et al. |
| 2002/0112048 A1 | 8/2002 | Gruyer et al. |
| 2002/0184388 A1 | 12/2002 | Yaseen et al. |
| 2002/0186664 A1 | 12/2002 | Gibson |
| 2002/0188643 A1 | 12/2002 | Kennedy |
| 2002/0191548 A1 | 12/2002 | Ylonen |
| 2003/0076837 A1 | 4/2003 | Whitehill et al. |
| 2003/0135508 A1 | 7/2003 | Chorafakis et al. |
| 2003/0169730 A1 | 9/2003 | Narasimhan et al. |
| 2004/0028212 A1 | 2/2004 | Lok et al. |
| 2004/0059831 A1 | 3/2004 | Chu et al. |
| 2004/0078373 A1 | 4/2004 | Ghoneimy et al. |
| 2004/0083379 A1 | 4/2004 | Neuman et al. |
| 2004/0136394 A1 | 7/2004 | Onno et al. |
| 2004/0187127 A1 | 9/2004 | Gondi et al. |
| 2004/0261116 A1 | 12/2004 | Mckeown et al. |
| 2005/0022208 A1 | 1/2005 | Bolar et al. |
| 2005/0050186 A1 | 3/2005 | Chen |
| 2005/0138634 A1 | 6/2005 | Luty et al. |
| 2005/0198221 A1 | 9/2005 | Manchester et al. |
| 2005/0256732 A1 | 11/2005 | Bauer et al. |
| 2006/0050862 A1 | 3/2006 | Shen et al. |
| 2006/0074732 A1 | 4/2006 | Shukla et al. |
| 2006/0080425 A1 | 4/2006 | Wood et al. |
| 2006/0112182 A1 | 5/2006 | Chen et al. |
| 2006/0180709 A1 | 8/2006 | Breton et al. |
| 2006/0184998 A1 | 8/2006 | Smith |
| 2006/0187854 A1 | 8/2006 | Booth, III et al. |
| 2006/0187855 A1 | 8/2006 | Booth, III et al. |
| 2006/0187856 A1 | 8/2006 | Booth, III et al. |
| 2006/0187937 A1 | 8/2006 | Townsley et al. |
| 2006/0190570 A1 | 8/2006 | Booth, III et al. |
| 2006/0206702 A1 | 9/2006 | Fausak |
| 2006/0248139 A1 | 11/2006 | Sundar |
| 2006/0259963 A1 | 11/2006 | Maxwell |
| 2006/0268829 A1 | 11/2006 | Nedeltchev |
| 2007/0011126 A1 | 1/2007 | Conner et al. |
| 2007/0115990 A1 | 5/2007 | Asati et al. |
| 2007/0130192 A1 | 6/2007 | Bolder et al. |
| 2007/0136788 A1 | 6/2007 | Monahan et al. |
| 2007/0165540 A1 | 7/2007 | Elias et al. |
| 2007/0206597 A1 | 9/2007 | Asati et al. |
| 2007/0253384 A1 | 11/2007 | Kanagala |
| 2007/0260575 A1 | 11/2007 | Robinson et al. |
| 2007/0271451 A1 | 11/2007 | Fluhrer |
| 2008/0037656 A1* | 2/2008 | Hannuksela ..... H04N 21/23614 375/240.26 |
| 2008/0052758 A1 | 2/2008 | Byrnes |
| 2008/0062997 A1 | 3/2008 | Nix |
| 2008/0075090 A1 | 3/2008 | Farricker |
| 2008/0117902 A1 | 5/2008 | Vinneras |
| 2008/0172440 A1 | 7/2008 | Jagannathan |
| 2008/0177868 A1 | 7/2008 | Zibershtein et al. |
| 2008/0189757 A1* | 8/2008 | Schackow ............... H04L 63/20 726/1 |
| 2008/0232379 A1 | 9/2008 | Mohamed |
| 2008/0281953 A1 | 11/2008 | Blaisdell |
| 2008/0298367 A1 | 12/2008 | Furukawa |
| 2009/0044253 A1 | 2/2009 | Interlandi et al. |
| 2009/0046729 A1 | 2/2009 | Nagata |
| 2009/0059814 A1 | 3/2009 | Nixon et al. |
| 2009/0067440 A1* | 3/2009 | Chadda ............... H04L 63/0227 370/401 |
| 2009/0073995 A1 | 3/2009 | Pandey et al. |
| 2009/0097417 A1 | 4/2009 | Asati et al. |
| 2009/0161679 A1 | 6/2009 | Yang |
| 2009/0249293 A1 | 10/2009 | Davies |
| 2009/0254639 A1 | 10/2009 | Manchester et al. |
| 2009/0282129 A9 | 11/2009 | Tindal |
| 2009/0304003 A1 | 12/2009 | Huynh |
| 2009/0304004 A1 | 12/2009 | Huynh Van et al. |
| 2009/0327869 A1 | 12/2009 | Fan et al. |
| 2010/0042725 A1 | 2/2010 | Jeon et al. |
| 2010/0054245 A1 | 3/2010 | Asati |
| 2010/0142410 A1 | 6/2010 | Huynh Van et al. |
| 2010/0180016 A1 | 7/2010 | Bugwadia |
| 2010/0226280 A1 | 9/2010 | Burns et al. |
| 2010/0226372 A1 | 9/2010 | Watanabe |
| 2010/0241698 A1 | 9/2010 | Hillerbrand |
| 2011/0013641 A1 | 1/2011 | Kolhi et al. |
| 2011/0176531 A1 | 7/2011 | Rune et al. |
| 2011/0276636 A1 | 11/2011 | Cheng et al. |
| 2011/0286384 A1 | 11/2011 | Sugimoto et al. |
| 2011/0289261 A1 | 11/2011 | Candelaria |
| 2012/0046058 A1 | 2/2012 | Vesterinen et al. |
| 2012/0057463 A1 | 3/2012 | Hurtta |
| 2012/0084423 A1 | 4/2012 | McGleenon |
| 2012/0089700 A1 | 4/2012 | Safruti et al. |
| 2012/0218993 A1 | 8/2012 | Masaki |
| 2012/0250516 A1 | 10/2012 | Aggarwal et al. |
| 2012/0265324 A1 | 10/2012 | Colombo et al. |
| 2013/0060929 A1 | 3/2013 | Koponen et al. |
| 2013/0085914 A1 | 4/2013 | McPherson |
| 2013/0117427 A1 | 5/2013 | Amano et al. |
| 2013/0223442 A1 | 8/2013 | Narayanan et al. |
| 2013/0279336 A1 | 10/2013 | Woelker |
| 2014/0052877 A1 | 2/2014 | Mao |
| 2014/0143419 A1 | 5/2014 | Vyatkin et al. |
| 2014/0169158 A1 | 6/2014 | Mishra et al. |
| 2014/0223530 A1 | 8/2014 | Nedeltchev et al. |
| 2014/0282628 A1 | 9/2014 | Pruss et al. |
| 2014/0371941 A1 | 12/2014 | Keller et al. |
| 2014/0372617 A1 | 12/2014 | Houyou et al. |
| 2015/0023210 A1 | 1/2015 | Kis |
| 2015/0058412 A1 | 2/2015 | Hillerbrand |
| 2015/0169345 A1 | 6/2015 | DeCusatis et al. |
| 2015/0172195 A1 | 6/2015 | DeCusatis et al. |
| 2015/0188772 A1 | 7/2015 | Gasparakis |
| 2015/0229709 A1 | 8/2015 | Pruss et al. |

(56) References Cited

U.S. PATENT DOCUMENTS

| | | | |
|---|---|---|---|
| 2015/0347175 | A1 | 12/2015 | DeCusatis et al. |
| 2015/0381410 | A1 | 12/2015 | Strassner |
| 2016/0036636 | A1 | 2/2016 | Erickson et al. |
| 2016/0057207 | A1 | 2/2016 | Li et al. |
| 2016/0112246 | A1 | 4/2016 | Singh et al. |
| 2016/0112269 | A1 | 4/2016 | Singh et al. |
| 2016/0127181 | A1 | 5/2016 | Li et al. |
| 2016/0142243 | A1 | 5/2016 | Karam et al. |
| 2016/0255051 | A1 | 9/2016 | Williams et al. |
| 2016/0381124 | A1 | 12/2016 | Hwang et al. |

FOREIGN PATENT DOCUMENTS

| | | |
|---|---|---|
| JP | 2011-199623 | 10/2011 |
| WO | WO-2004/090672 | 10/2004 |
| WO | WO-2013/093702 | 6/2013 |
| WO | WO-2013/177311 | 11/2013 |

OTHER PUBLICATIONS

Written Opinion issued in International Application No. PCT/US2009/045155, mailed Jul. 6, 2009.
International Search Report issued in International Application No. PCT/US2009/045159, mailed Aug. 24, 2009.
Written Opinion issued in International Application No. PCT/US2009/045159, mailed Aug. 24, 2009.
International Search Report issued in International Application No. PCT/US2009/045159, mailed Sep. 24, 2009.
Written Opinion issued in International Application No. PCT/US2009/045159, mailed Sep. 24, 2009.
B. Weis, "Group Domain of Interpretation (GDOI) Support for RSVP", MSEC Working Group, Internet—Draft, Jun. 21, 2007 [retrieved Aug. 15, 2009], http://www.watersprings.com/pub/id/draft-weis-gdoi-for-rsvp-00.txt.
International Search Report issued in International Application No. PCT/US2009/067384, mailed Jul. 20, 2010.
Written Opinion issued in International Application No. PCT/US2009/067384, mailed Jul. 20, 2010.
"OSGI Alliance", printed from http://www.osgi.org, on Sep. 26, 2014 (2 pages).
"Equinox Framework QuickStart Guide" printed from http://www.eclipse.org/equinox/documents/quickstart-framework.php, on Sep. 26, 2014 (5 pages).
"Human Machine Interface (HMI)" http://en.wikipedia.org/wiki/Human-machine_interface, on Sep. 26, 2014, Last updated Sep. 20, 2014 (2 pages).
File History of U.S. Appl. No. 12/634,536.
File History of U.S. Appl. No. 12/471,179.
File History of U.S. Appl. No. 12/471,199.
File History of U.S. Appl. No. 13/830,801.
File History of U.S. Appl. No. 13/830,737.
File History of U.S. Appl. No. 14/017,696.
File History of U.S. Appl. No. 14/219,685.
File History of U.S. Appl. No. 14/219,654.
File History of U.S. Appl. No. 14/490,424.
File History of U.S. Appl. No. 12/634,536 for Oct. 20, 2015 to Jan. 20, 2015.
File History of U.S. Appl. No. 13/830,737 for Oct. 20, 2015 to Jan. 20, 2015.
File History of U.S. Appl. No. 14/017,696 for Oct. 20, 2015 to Jan. 20, 2015.
File History of U.S. Appl. No. 12/634,536 for Jan. 20, 2015 to Jan. 11, 2016.
File History of U.S. Appl. No. 13/830,801 for Sep. 26, 2014 to Jan. 11, 2016.
File History of U.S. Appl. No. 13/830,737 for Jan. 20, 2015 to Jan. 11, 2016.
File History of U.S. Appl. No. 14/017,696 for Jan. 20, 2015 to Jan. 11, 2016.
File History of U.S. Appl. No. 14/490,424 for Sep. 26, 2014 to Jan. 11, 2016.
Cisco, "Cisco IOS IP Routing: BFD Configuration Guide", Release 15.1, 2010, Cisco System, Inc. retrieved from http://www.cisco.com/c/en/us/td/docs/ios/iproute_bfd/configuration/guide/15_1/irb_15_1_book.pdf, 110 pages.
File History of U.S. Appl. No. 12/634,536 for Jan. 11, 2016 to Sep. 2, 2016.
File History of U.S. Appl. No. 13/830,737 for Jan. 11, 2016 to Sep. 2, 2016.
File History of U.S. Appl. No. 14/017,696 for Jan. 11, 2016 to Sep. 2, 2016.
File History of U.S. Appl. No. 14/219,685 for Sep. 26, 2014 to Sep. 2, 2016.
File History of U.S. Appl. No. 14/219,654 for Sep. 26, 2014 to Sep. 2, 2016.
File History of U.S. Appl. No. 14/490,424 for Jan. 11, 2016 to Sep. 2, 2016.
File History of U.S. Appl. No. 14/997,119.
File History of U.S. Appl. No. 15/056,776.
File History of U.S. Appl. No. 15/078,267.
Oscar Mejia, "How to Create a Command Line Program with NodeJS", Aug. 5, 2012, retrieved from https://web.archive.org/web/20130314232203/http://oscar-mejia.com/blog.how-to-create-a-command-line-program-with-nodejs/ (8 pages).
George Ornbo, "Command Line Utilities with Node.js", Jan. 2, 2014, retrieved from http://shapeshed.com/commandlineutilitieswithnodejs/ (4 pages.
"Command Line JavaScript", Oct. 15, 2012, retrieved from http://web.archive.org/web/20121015021129/http://javascript.cs.lmu.edu.notes.commandlinejs (8 pages).
File History of U.S. Appl. No. 13/830,737 for Sep. 30, 2016 to Feb. 6, 2017.
File History of U.S. Appl. No. 14/219,685 for Sep. 30, 2016 to Feb. 6, 2017.
File History of U.S. Appl. No. 14/219,654 for Sep. 2, 2016 to Feb. 6, 2017.
File History of U.S. Appl. No. 14/490,424 for Sep. 2, 2016 to Feb. 6, 2017.
File History of U.S. Appl. No. 14/997,119 for Sep. 30, 2016 to Feb. 6, 2017.
File History of U.S. Appl. No. 15/056,776 for Sep. 2, 2016 to Feb. 6, 2017.
File History of U.S. Appl. No. 13/830,737 for Feb. 6, 2017 to Mar. 15, 2017.
File History of U.S. Appl. No. 14/017,696 for Sep. 2, 2016 to Mar. 15, 2017.
File History of U.S. Appl. No. 14/219,654 for Sep. 2, 2016 to Mar. 15, 2017.
File History of U.S. Appl. No. 15/078,267 for Sep. 2, 2016 to Mar. 15, 2017.
File History of U.S. Appl. No. 13/830,737 for Sep. 2, 2016 to Sep. 30, 2016.
File History of U.S. Appl. No. 14/219,685 for Sep. 2, 2016 to Sep. 30, 2016.
File History of U.S. Appl. No. 14/997,119 for Sep. 2, 2016 to Sep. 30, 2016.
English language abstract of CN-102315971 dated Jan. 11, 2012.
English language abstract of JP-2000-209239 dated Jul. 28, 2000.
English language abstract of JP-2011-199623 dated Oct. 6, 2011.
File History of U.S. Appl. No. 13/830,737 for Mar. 15, 2017 to May 8, 2017.
File History of U.S. Appl. No. 14/219,685 for Mar. 15, 2017 to May 8, 2017.
File History of U.S. Appl. No. 14/219,654 for Feb. 6, 2017 to May 8, 2017.
File History of U.S. Appl. No. 14/490,424 for Feb. 6, 2017 to May 8, 2017.
File History of U.S. Appl. No. 14/997,119 for Feb. 6, 2017 to May 8, 2017.
File History of U.S. Appl. No. 15/056,776 for Feb. 6, 2017 to May 8, 2017.

(56) References Cited

OTHER PUBLICATIONS

Jan Medved et al., "OpenDaylight: Towards a Model-Driven SDN Controller Architecture", Proceeding of IEEE International Symposium on a World of Wireless, Mobile and Multimedia Networks 2014, 7 Pages, Oct. 9, 2014.
"Glue Networks deployment Guide for the Cisco Next-Generation WAN", May 1, 2013, retrieved from http://www.cisco.com/c/en/us/td/docs/solutions/Enterprise/WAN_and_MAN/GlueNtwksDepGuide.pfd (29 pages).
File History of U.S. Appl. No. 13/830,737 for May 8, 2017 to Jul. 11, 2017.
File History of U.S. Appl. No. 14/219,685 for May 8, 2017 to Jul. 11, 2017.
File History of U.S. Appl. No. 14/219,654 for May 8, 2017 to Jul. 11, 2017.
File History of U.S. Appl. No. 15/056,776 for May 8, 2017 to Jul. 11, 2017.
File History of U.S. Appl. No. 13/830,737 for Jul. 12, 2017 to Aug. 2, 2017.
File History of U.S. Appl. No. 14/490,424 for Jul. 12, 2017 to Aug. 2, 2017.

\* cited by examiner

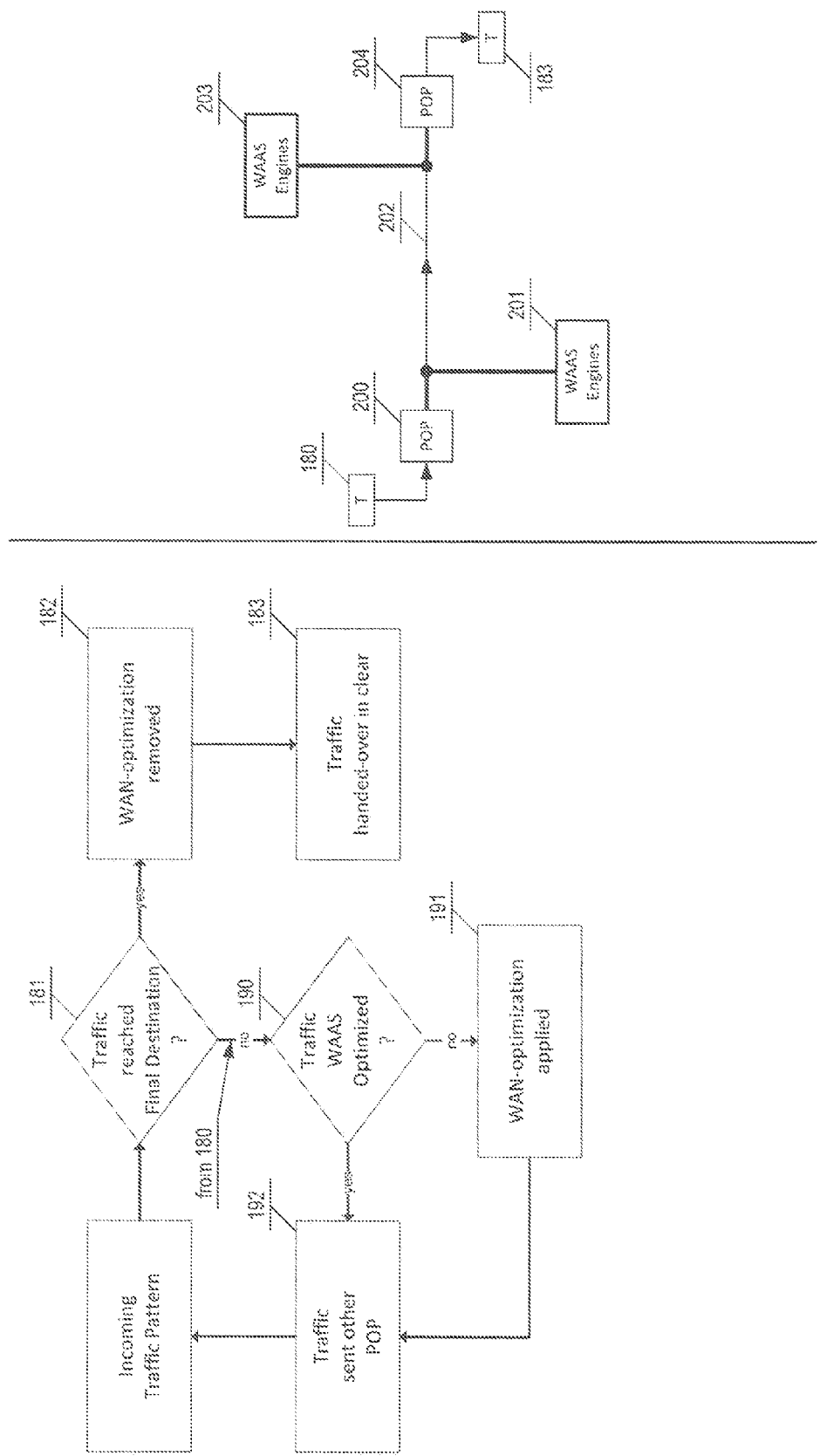
FIGURE 4bis

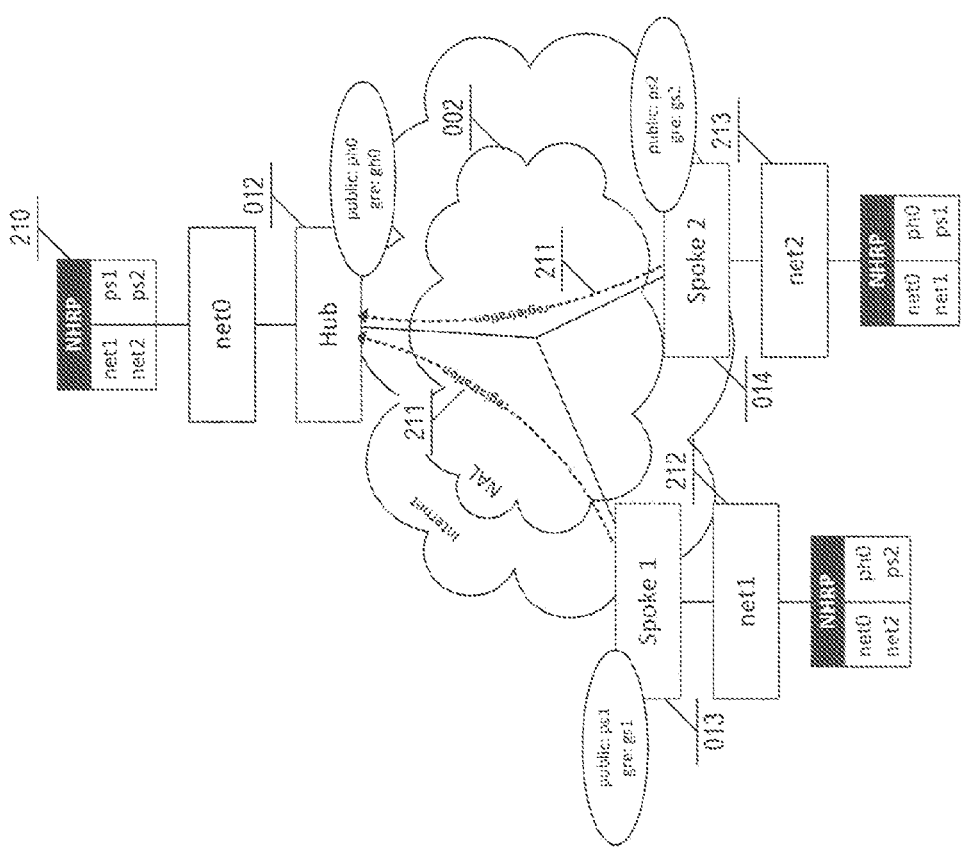
FIGURE 4ter

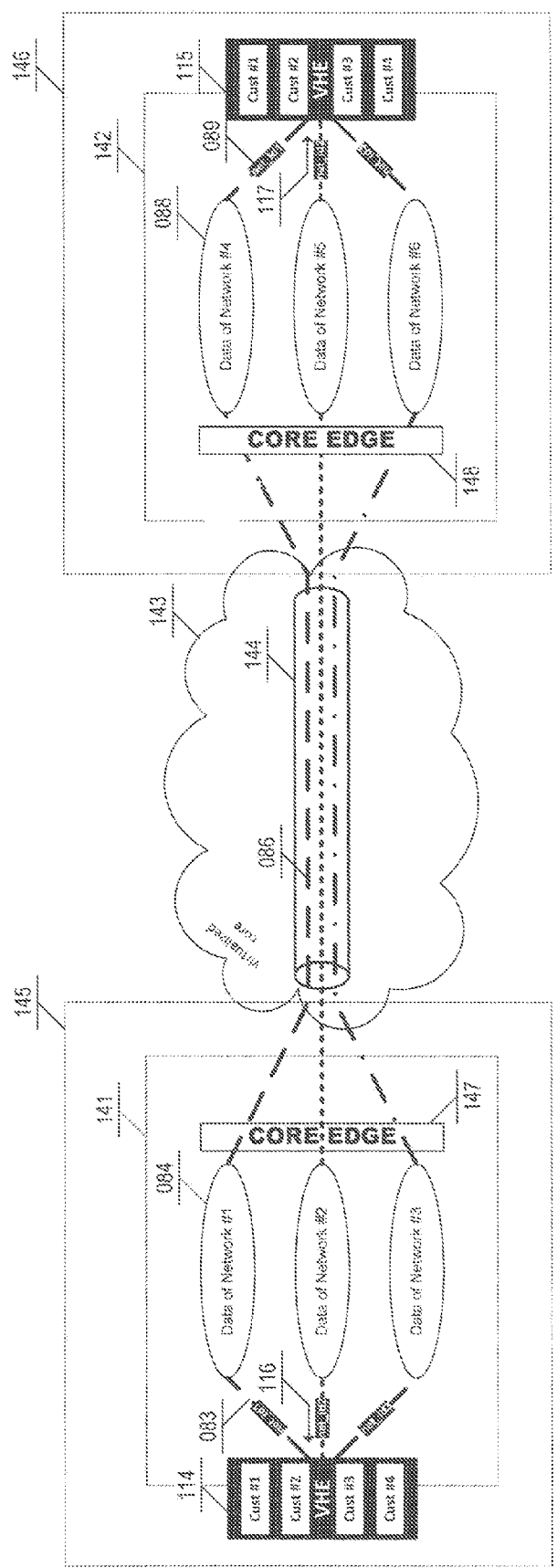

METHODS AND SYSTEMS FOR COMMUNICATING USING A VIRTUAL PRIVATE NETWORK

RELATED APPLICATIONS

This application is a Continuation of U.S. patent application Ser. No. 12/471,199, filed May 22, 2009, which claims priority to U.S. Provisional Application No. 61/056,268 filed May 27, 2008, which are incorporated herein by reference in their entirety as if fully set forth herein.

This application is also related to U.S. patent application Ser. No. 12/471,179 filed May 22, 2009 entitled Global Virtual VPN (now Abandoned) which is incorporated herein by reference in its entirety as if fully set forth herein.

FIELD OF INVENTION

The present invention relates in general to network communications and specifically to create improved virtual private networks over the Internet, with unattended provisioning features for network service providers and virtualized physical platforms.

BACKGROUND

A VPN solution is a communication network that connects different private regions through another network. There are two types of VPNs: IP VPNs and IPSec VPNs. An IP VPN is a dedicated network service using a provider's private network as the transport means. For instance, MPLS-based solutions are IP VPNs. An IPSec VPN is a network that leverages a public infrastructure like Internet as the transport mechanism. As it runs over a public network, the data is encrypted by the VPN devices as they exit the regions using ciphering techniques like IPSec protocol to ensure privacy and man-in-the-middle attacks.

VPNs comprise of two components as shown on FIG. 2: the hubs and the spokes. The hubs have the roles of aggregating and authenticating all the members connecting to the same VPN network. The spokes are the members of that VPN network. Spokes encrypt the traffic before sending it to another member over the public network. When traffic encrypted is received from the Internet, the spokes decrypt the traffic and hand it off to the private networks.

IP VPNs have lots of advantages like strong Service Level Agreements (SLA) or good performance but they are very expensive as well. In the other hand, IPSec VPNs are cheap alternative to these IP VPN solutions. But they are far from providing the same level of service due to the technology limitations. They are most of the time based on a network topology that requires the traffic to always transit via a central point before reaching any destination.

Multimedia traffic is not handled easily as quality of service (QoS) is not supported (because when the traffic gets encrypted, it can't be classified by QoS capable devices along the way and therefore is treated in a best effort manner). Also, IPSec VPNs are using devices that are deployed using a per-customer basis. They can't be shared between customers. IPSec VPN devices can only be members of one IPSec VPN network. Finally, Internet-based VPN networks also introduce a significant network performance degradation compared to IP VPNs.

This can affect time sensitive applications from running correctly, impacting the user experience, especially in a worldwide deployment.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4*bis* is a network diagram showing further steps for building improved virtual private networks in accordance with the embodiments of the invention.

FIG. 4*ter* is a network diagram illustrating further steps for building improved virtual private networks in accordance with the embodiments of the invention.

FIG. 8*bis* is a network diagram showing further steps for building improved virtual private networks in accordance with the embodiments of the invention.

Figure 1:
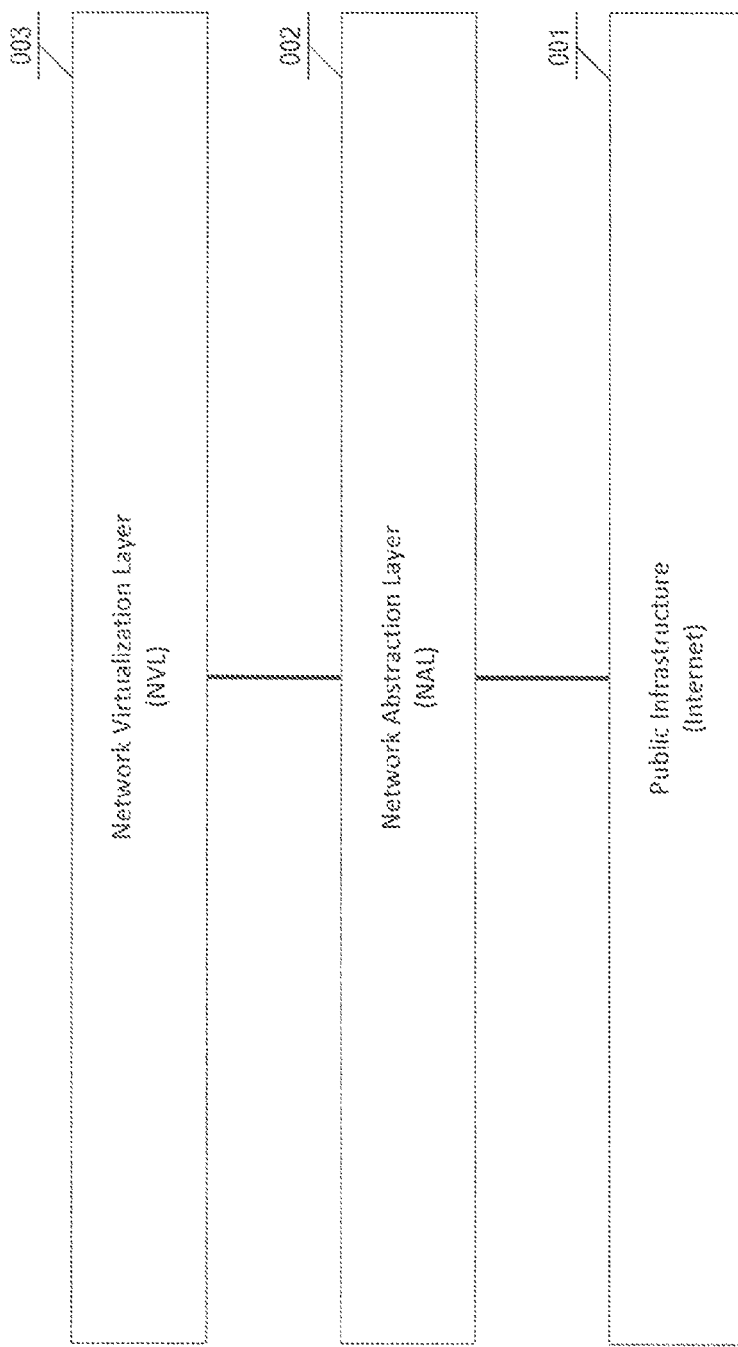
FIG. 1 is a block diagram illustrating a network communication network in accordance with some embodiments of the invention.

Skilled artisans will appreciate that elements in the figures are illustrated for simplifying and clarity and have not necessarily been drawn to scale. For example, the dimensions of some of the elements in the figures may be exaggerated relative to other elements to help improve understanding of embodiments of the present invention.

DETAILED DESCRIPTION OF THE DRAWINGS

Before describing in detail embodiments that are in accordance with the present invention, it should be observed that the embodiments reside primarily in combinations of method steps and apparatus components related to providing faster Internet-based virtual private networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, the terms "comprises", "comprising" or any other variation thereof, are intended to cover a non-exclusive inclusion, such as a process, method, article or apparatus that comprises a list of elements does not include only those elements but may include other elements not expressly listed or inherent such process, method, article or apparatus. An element proceeded by "comprises . . . a" does not, without more constrains, preclude the existence of additional identical elements in the process, method, article or apparatus that comprises the element.

It will be appreciated that embodiments of the invention described herein may be comprised of one or more conventional network devices or endpoints and unique stored configurations that control the one of more network devices to implement, in conjunction with certain network circuits, some, most, or all of the functions of method and apparatus for providing improved virtual private networks described herein. The network devices may include, but are not limited to, a central processing unit (CPU), volatile and non-volatile memory banks, network interface cards or ports, power source circuits and user input devices. As such, these functions may be interpreted as steps of a method that delivers improved virtual private networks. Alternatively, some or all the functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will readily capable of generating such software instructions and programs in minimal, and not undue, experimentation.

An embodiment of the invention is to improve the communication between two routing devices located in different continent. According to one embodiment, one enhancement includes the attachment of the routing devices to a closest point of presence within the same continent to overcome the unpredictable behavior of Internet between continents. Another embodiment of the invention is the unattended IP routing information distributed over the Internet by daemons to all the endpoints using host-based static routing information only (no default gateway used in endpoint configurations). According to one embodiment, using shared encryption keys between endpoints of the same network solves the resource management (memory, CPU) of the endpoints in addition to improving the network responsiveness. Another embodiment of the invention is to improve the X.509 certificates delivery process and associated services by using load-balanced certification authorities. According to the same embodiment, the resulting network design also claims a better network protection of the certification authorities. Another embodiment of the invention is to improve the number of differentiated networks on the same aggregating devices located at the points of presence. According to one embodiment, the use of virtualization capabilities of the routing devices may allow the traffic from different origins to be handled by the same physical devices. The architecture of the physical platforms and the logical network topology that enable the Virtual VPN solution constitute other embodiment. According to another embodiment, advanced traffic scheduling techniques are used to manage the behavior of the network packets over the last mile (i.e. the circuit connected to the endpoint). According to another embodiment, the endpoint interface scheduling behavior is optimized by reducing the transmit ring queue length. According to another embodiment, the particular network topology enabled the use of a fully automated unattended remote provisioning methodology.

As shown on FIG. 1, two layers are built on top of the Internet (001) as part of the Virtual VPN solution: the Network Abstraction Layer (NAL) (002) and the Network Virtualization Layer (NVL) (003). The NAL (002) creates a network underlying foundation to support the NVL (003).

Figure 2:
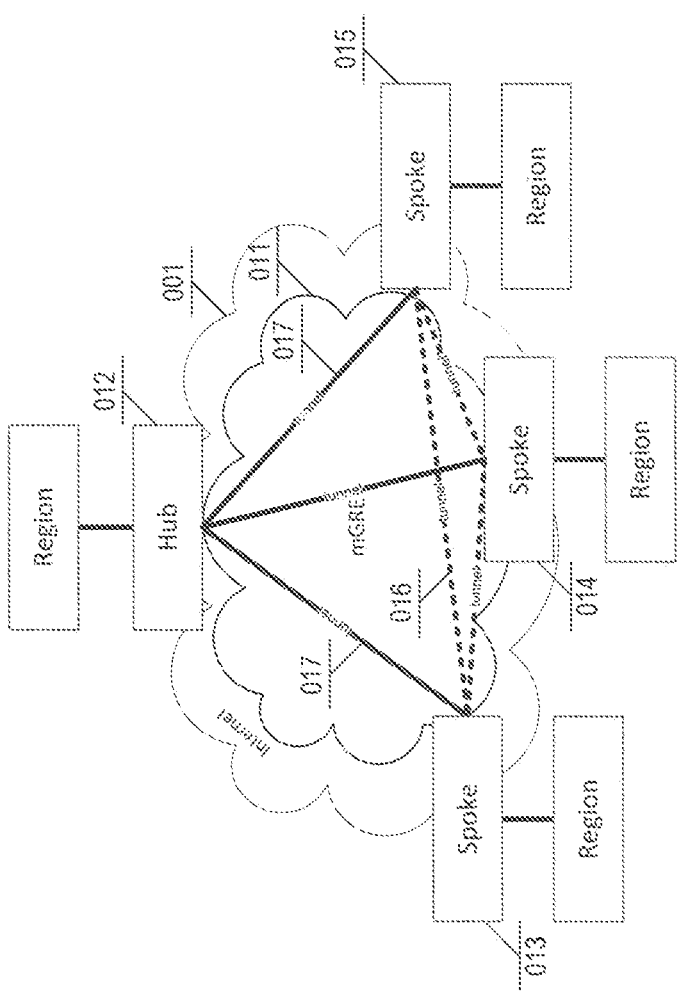
FIG. 2 is a prior art network diagram showing how some communications network are setup today.

The NAL (002) relies on Generic Routing Encapsulation (GRE) protocol. GRE is a tunneling protocol designed to encapsulate a wide variety of network layer packets inside IP tunneling packets. A tunneling protocol is used when one network protocol called the payload protocol is encapsulated within a different delivery protocol. GRE tunneling protocol is used to provide a cloud of virtual paths, the NAL (002) through an untrusted network (001). As shown on FIG. 2, a NAL (002) consist of a GRE network (011) built over the Internet (001). The endpoints of the NAL (002) are devices (012, 012, 013, 015) that can have connectivity between each other. One endpoint, called the hub (012), is the network intelligence of the GRE network (011). It is responsible for registration of the other endpoints (013, 014, 015) in the network. When a data flow goes from a hub (012) to or from a spoke (013, 014 or 015), the type of traffic flow is called hub-to-spoke (017). This refers to a point-to-point GRE network (p2p GRE). When a data flow goes from a spoke (013, 014 or 015) to another spoke (013, 014 or 015), the type of traffic flow is called spoke-to-spoke (016). This refers to a point-to-multipoint GRE network or multipoint GRE network (mGRE). mGRE networks have all the specifications of the p2p GRE network with the improvement of a spoke to be directly capable of reaching another spoke without the traffic to transit via a hub (assuming the underlying network on which the GRE network is built is capable of routing from one spoke to another; that is the case for the Internet used as the underlying network). In the case of this Virtual VPN solution, multipoint GRE (mGRE) over the Internet is used to create the Network Abstraction Layer (NAL). mGRE creates virtual links between all the endpoints (routers) over the public network. mGRE networks comprise of two types of nodes: hubs (also called head-ends) and spokes. Hubs are routers that have the role of aggregation and are in charge of maintaining a database with all the information of the spokes within the mGRE network or cloud. Usually the hubs are hosted in a data centre. The spokes are routers that are members of the cloud. The spokes are at the locations that need to communicate to all the other location or/and to the date centre. An mGRE network includes, but is not limited to, one hub. Several hubs can be deployed for resiliency.

Figure 3:
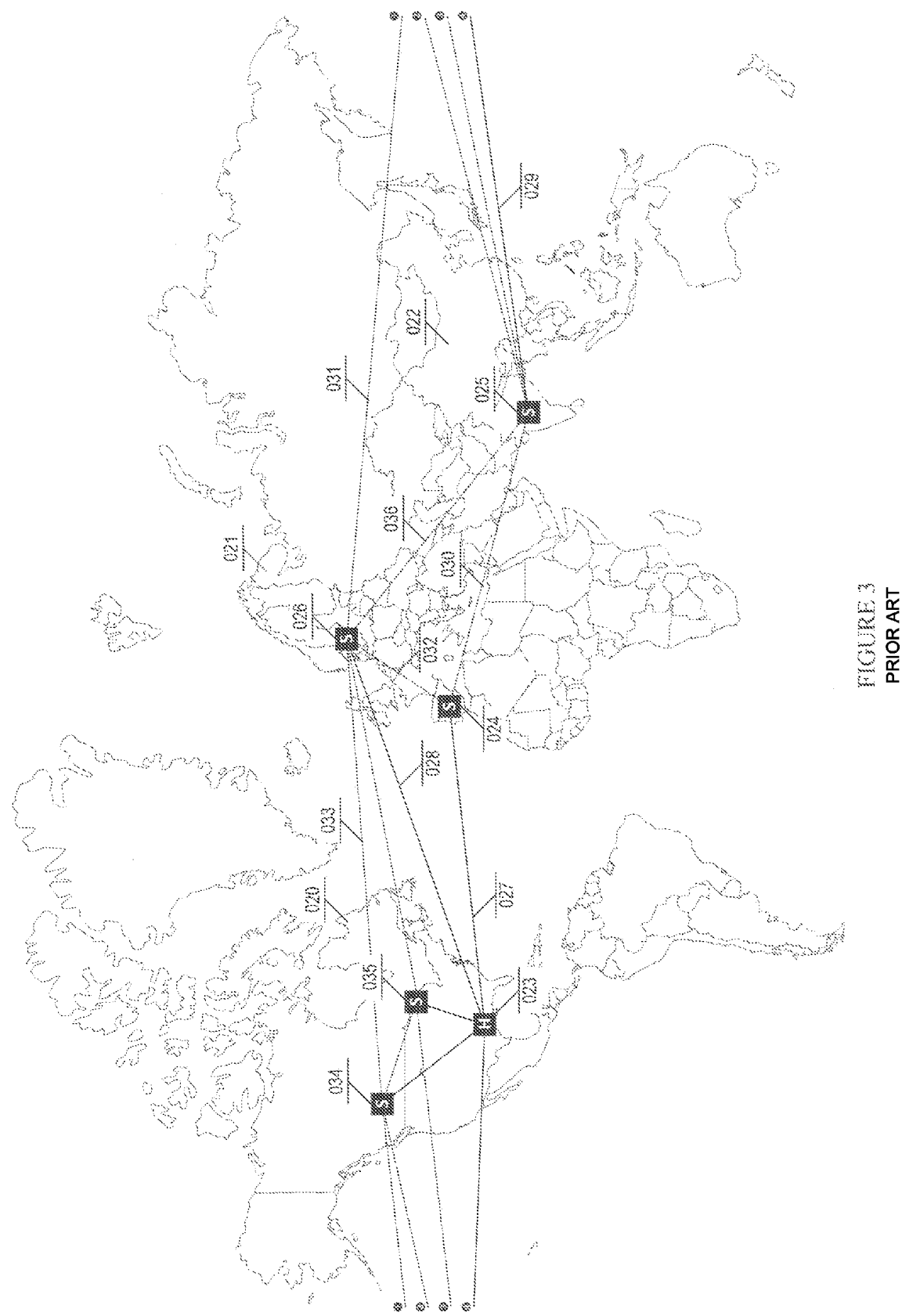
FIG. 3 is a prior art network diagram showing how some communications network are setup today.
Figure 4:
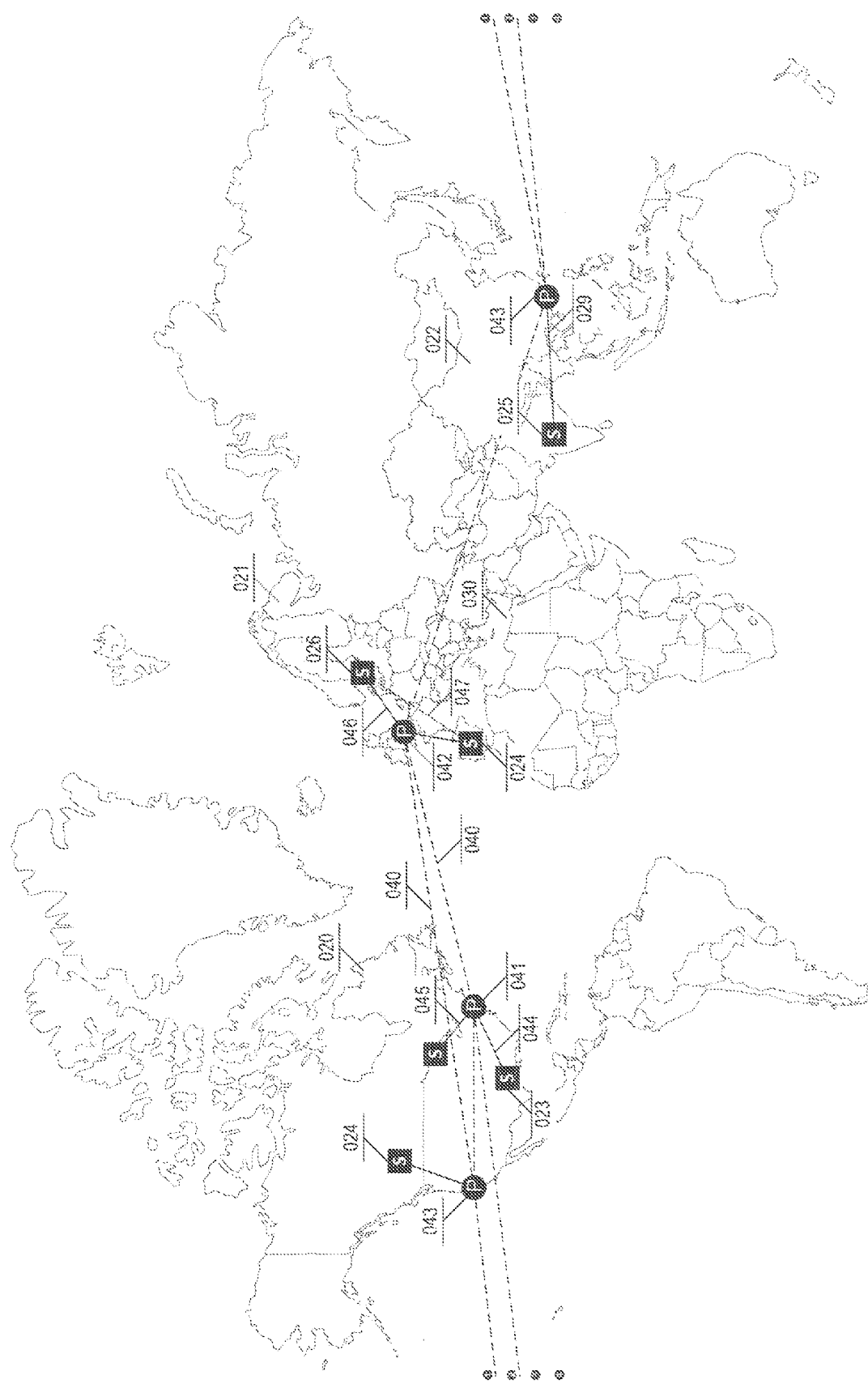
FIG. 4 is a network diagram illustrating further steps for building improved virtual private networks in accordance with the embodiments of the invention.

As shown on FIG. 3 as a prior art drawing, an mGRE network in worldwide deployment can have an impact on the user experience as the hub-to-spoke or spoke-to-spoke traffic relies on the Internet routing capabilities. As illustrated on FIG. 3, a standard spoke-to-spoke mGRE network with endpoints in America (020), Europe (021) and Asia (022) continents. There are one spoke (026) in Sweden, one spoke (024) in Spain, one spoke (025) in India, one spoke in the US (035) and one spoke (034) in Canada. All of them connect with virtual links (027, 028, 029) to a hub (023) located in the US. These are virtual links because there are links established over the Internet: there is no physical links between these locations; the traffic is routed from one location to another via the public network. When a spoke needs to reach another spoke, direct virtual links from one spoke to another spoke are dynamically established on demand, by establishing an encrypted tunnel over the Internet. If the spoke (026) located in Sweden needs to establish a communication with the spoke (024) located in Spain, a spoke-to-spoke link is built (032). The exact same scenario happens when a spoke (026) located in Sweden has to talk with a spoke (025) located in India, a spoke-to-spoke link is built (036). The issue in this scenario is that the transit between Asia and Europe has an unpredictable behavior due to the distance: packet loss, latency or long round trip time (RTT) as most of the traffic between Europe and Asia mostly passes through the US. Some applications are very sensitive to latency. Latency is a time delay between the moment something is initiated, and the moment one of its effects begins or becomes detectable. Above a certain amount of latency introduced by the network, some applications might become unusable: responsiveness of applications too slow, connections dropping . . . . As a prior art example in FIG. 3, when a link (031) between two endpoints (026, 034) is established over the Internet and these two endpoints are not located in the same continent, the overall performance of the communication is heavily degraded (packet loss, latency). In one embodiment, performance degradation is solved by using regional hubs, where regional hubs are connected together using private high speed and low latency circuits. As shown on FIG. 4, the spokes are connected to closer hubs (041, 042, 043). The latter are connected together using private high speed low latency links (040) featuring WAN optimization techniques. The WAN optimization engines are network appliances or software that uses various WAN optimization algorithms that result in a reduced amount of data to be sent across the network media to accelerate the application performance and improve the user experience. These optimization algorithms also called Wide Area Application Service (WAAS) ("WAN Optimization" and "WAAS" will be used interchangeably in this patent) consists in, but in not limited to, Transport Flow Optimization (TFO), Data Redundancy Elimination (DRE), Adaptive Persistent Session-based Compression, Protocol Acceleration (application-layer read-ahead, operation prediction, message multiplexing, pipelining, and parallelization), Content Pre-Positioning, Meta-Caching. The WAN optimization process is summarized on FIG. 4bis. WAN-optimized traffic (202) can only be "readable" between WAN optimization engines (201, 203). When the traffic reaches (180) a point of presence (such as POP 200 or POP 204), it is checked whether it is already WAN optimized (190). If the traffic is not WAN-optimized (190:no) and has to be sent to another point of presence (192), the local WAN optimization engine (201) will compress the traffic (191) using the WAN optimization techniques and sent it across the WAN network (202). The traffic will remain WAN-optimized until it reaches its final destination (181). When received by the final point of presence (181:yes, POP 204), the process of removing the WAN optimization is achieved (182). The traffic is then handed over in clear (183). Back to FIG. 3, the spoke based in Spain (024) is no longer connected to the hub (023) based in America using the Internet. In FIG. 4, the spoke (024) is connected to a regional hub (042) based in Europe. No longer aggregating spokes, the hub (023 in FIG. 3) becomes another spoke (023 in FIG. 4) in its regional network and is connected to another aggregating hub (041) in America. The two hubs (041) and (042) are connected together using a private WAN optimized link (040). The spoke-to-spoke connectivity (047) is handled by the local Internet routing. No traffic transits via the ex-hub (023). Spoke-to-spoke connectivity can only occur within a same continent. Those skilled in the art should appreciate the gain of performance that localized hubs bring to the network. The behavior of the Internet is predictable when two endpoints communicate within the same continent. When transiting from one continent to another, the behavior and resulting performance cannot be easily anticipated. Using localized hubs based in private points of presence (041, 042, 043) bring an end to end predictable connectivity with dramatically reduced transit time (and as a consequence, resulting in a packet loss reduction and minimized network latency). In order to the mGRE network to be established successfully over the Internet, another protocol is used in order to translate the public Internet IP addresses to the target IP addresses handled by the spokes. As illustrated on FIG. 4ter, a table (210) is built by the hub (012) at the registration process (211) of the spokes (013, 014): all spoke IP addressing details are recorded at that time, both the internal LAN network details (IP subnets) (212, 213) and public IP addresses. In the case of GRE, Next Hop Resolution Protocol (NHRP) is the protocol used to translate the public IP addresses—also called Non-broadcast Multiple Access Network (NBMA) addresses—to the target LAN IP subnets (212, 213). An NBMA network is a network to which multiple computers and devices are attached, but data is transmitted directly from one computer to another over virtual circuits like the GRE network. A hub acts as an NHRP server where the spoke are NHRP clients. A hub can also act as an NHRP client towards other hubs. One successful implantation of mGRE over Internet using NHRP protocol is Cisco Dynamic Multipoint VPN (DMVPN).

Figure 5:
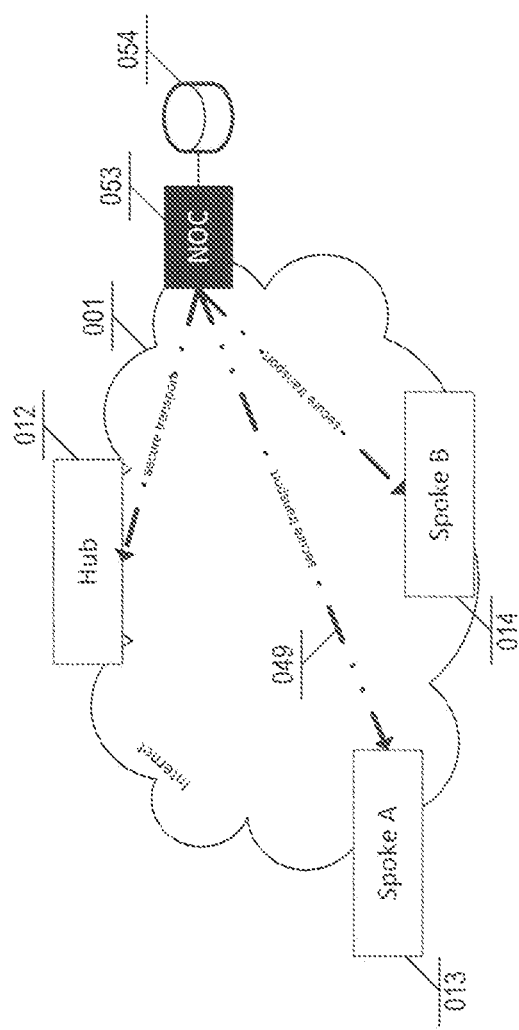
FIG. 5 is a network diagram showing further steps for building improved virtual private networks in accordance with the embodiments of the invention.

In order to build the mGRE network, the spokes have to have the endpoints IP routing information (IP routes to the NBMA IP addresses). In one embodiment, as shown on FIG. 5, the NBMA IP addresses of all the other endpoints are sent using remote agents based in a network operation centre (053) in order to optionally preserve the default IP route in each endpoint. The remote agents are automation daemons such as those seen in Cisco VFrame solution or HP Opsware software. All the NBMA addresses of the endpoints (012, 013, 014) are stored on a database (054) that the agents can use to generate the changes of the endpoints (012, 013, 014) routing table. The latter are sent to the endpoints using a secure transport (049) like, but not limited to SNMP v3, SSH, SCP, SSL-based or TLS-based protocols. Those skilled in the art would appreciate that no default route is sent to the endpoints in order to use a default route within the private network (if needed). That is the ultimate goal of that embodiment. Once the mGRE network is built, hubs and spokes are connected together. The resulting network is the Network Abstraction Layer (NAL).

The NAL may also be formed by a collection of network protocols providing the same subset of functionality provided by NHRP over mGRE or DMVPN as described earlier. The NAL can be formed by any protocols to build up the underlying network layer (NAL) as far as there is a direct IP network link from one endpoint to another. These underlying could be Layer 2 Tunneling Protocol (L2TP) Point-to-Point Tunneling Protocol (PPTP), MultiProtocol Label Switching (MPLS), Overlay Transport Virtualization (OTV), Virtual Private LAN Switching (VPLS).

Figure 6:
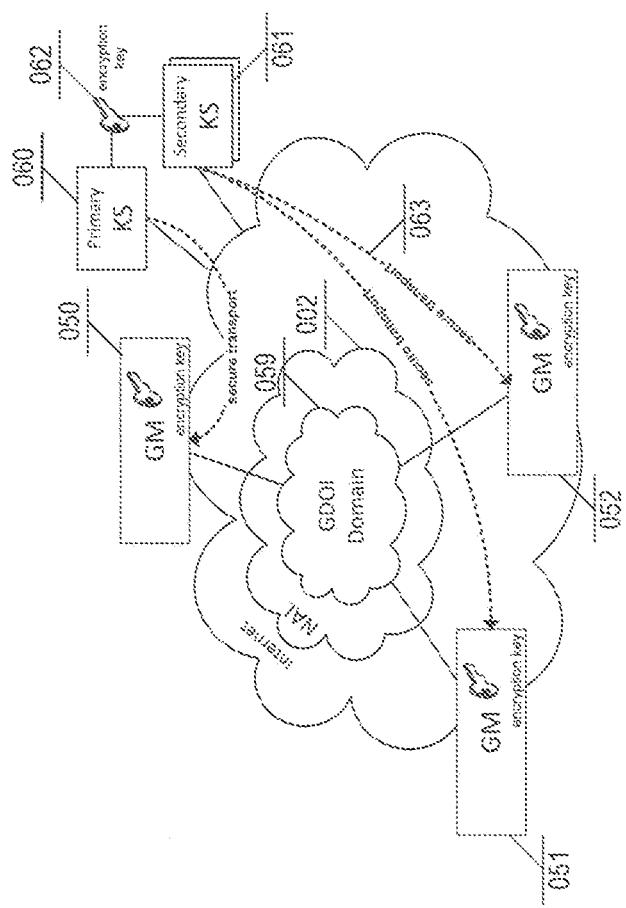
FIG. 6 is a network diagram illustrating further steps for building improved virtual private networks in accordance with the embodiments of the invention.
Figure 7:
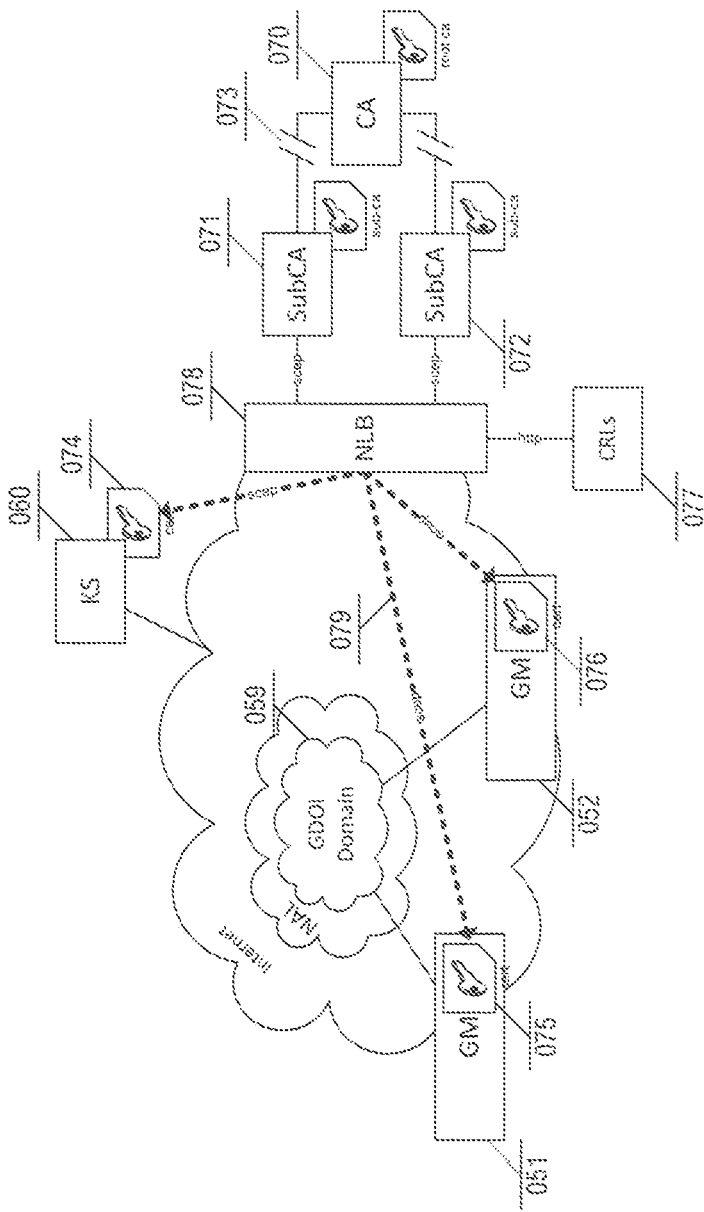
FIG. 7 is a network diagram illustrating further steps for building improved virtual private networks in accordance with the embodiments of the invention.

The Network Virtualization Layer (NVL) consists in adding an encryption layer on top of the NAL. IPSec (IP security) protocol is used to encode/decode the traffic. IPSec is a suite of protocols for securing IP communications by authenticating and/or encrypting each IP packet in a data stream. IPSec also includes protocols for cryptographic key establishment. Although IPSec provides a very high level of security, encryption and decryption processes are resource intensive. IPSec requires cryptographic keys to be stored in memory. A cryptographic key is required for each communication exchange with another endpoint. Each endpoint has a key set and uses it to exchange data with another endpoint. In a network with many spokes, a large number of spoke-to-spoke flows can end up in a resource starvation of the endpoints, degrading the network performance. In addition to that issue, the tunnel establishment takes time and is not compatible with time sensitive applications. In one embodiment, the NVL is based on the GDOI protocol to overcome these two known issues: the GDOI protocol (GDOI) adds advanced endpoint resource management in a complex network topology and removal of the tunnel establishment time. The virtual links between endpoints are instantly available. GDOI allows distributing the same encryption key to every endpoint of the cloud as shown in FIG. 6. As a consequence, only one key (062) is required for an endpoint (051) to communicate with any other endpoint (050, 052). All members get that same key (062) from a key server (KS) (060 or 061) and are called Group Members (GM). The KS (060, 061) is a key component of a GDOI domain (059). The KS are responsible for distributing and synchronizing the same encryption key to all the members (050, 051, 052) of the domain (059). The encryption key is distribution mechanism (063) can be achieved using either unicast or multicast transport. The number of KS within a GDOI domain is not limited to one server: several synchronized servers can deploy the same encryption key whilst sharing the workload. Before getting an encryption key from the KS, an endpoint needs to authenticate to the KS. The authentication process can be achieved using X.509 certificates or pre-shared (secret) keywords. The Virtual VPN solution relies on certificates as the level of security is much higher than secret keywords. As shown on FIG. 7, in one embodiment, the certificate delivery process is performed by load-balanced subordinate certification authorities (CA) (071, 072) to minimize the root CA (070) exposure and to add scalability to the network design. A certification authority (CA) is an entity which issues digital certificates for use by other authenticated parties. The root CA (070) is taken offline (073) to mitigate the risk of network attacks from the outside world. It will only be used to renew or create certificates of the subordinate certification authorities. All GMs (051, 052), including the KS (060) receive a signed certificate (074, 075, 076) from the subordinate CAs (071 or 072). The Simple Certificate Enrolment Protocol (SCEP) used to deliver the certificates (079). SCEP is a protocol using Hyper Text Transfer Protocol (HTTP) as the transport mechanism. It is therefore very easy to deploy network load-balancers (NLB) (078) to load share the subordinate CAs (071, 072). Network load-balancers (NLB) are network equipments that share the network load to several network devices to which it is connected to. All these network devices are seen as one logical network device. The NLB (078) arbitrates and redirects the traffic to the most available network device based upon relevant criteria like, but not limited to, the current load, the response time. As a consequence, all the endpoints (051, 052, 060) configuration only require to point at the NLB (078) IP address rather than having to manually be configured on which subordinate CA (071 or 072) each endpoint should get their certificates. The NLB (078) also load-balances the HTTP servers that publish the Certificate Revocation Lists (CRL) (077). A CRL is a list of certificates serial numbers which have been revoked, are no longer valid, and should not be relied on by any endpoint. Publishing CRLs is a way of ensuring validity of certificates. When the certificate enrolment is achieved successfully, each endpoint has a valid certificate (074, 075, 076) to claim an encryption key from the KS (060). Still part of the same embodiment, a certificate renewal process is set up to automatically occur when the certificate as about to expire. A reasonable amount of time like 10% of the certificate I lifetime is given to ensure enough time is given to the certificate renewal process so that no endpoints end up with no certificates.

Once the endpoint has received the X.509 certificate, it will connect to the KS to get an encryption key. If the certificate is valid, the authentication process is successful and the KS will deliver the current encryption key along with all the other following keys. Like certificates, each encryption key has a lifetime. When its lifetime expires, the encryption key is no longer usable. When the encryption key is about to expire, a key encryption renewal process needs to occur. Again, a fair amount of time is given to the renewal process to avoid an encryption key starvation on the group members. The encryption key renewal process is identical as the key distribution process that has been described in FIG. 6. When a group member (050, 051, 052) receives a new encryption key (062), the old key is discarded. The key (062) distribution process is achieved by one primary KS (060) and several secondary KS (061). The primary KS is responsible for the encryption key generation and synchronization of the encryption key with all the secondary KS. Both primary and secondary KSs can distribute encryption keys to group members. This technique allows to spread the distribution workload across all available KSs.

In a data center, in a normal situation, there are plenty of free available resources in each performing device: available disk space, idle CPU time, or free memory. All these dedicated resources are inefficiently allocated because not shared with the other devices and as a result, are just wasted. For instance, an overwhelmed device out of memory could use some of the free memory space of the neighboring device. Virtualization is a device capability that solves the inefficiency of use of the available resource pool within a physical device. For instance, it is unlikely to find a router with 99% of current CPU and memory use: firstly, because such a router will be replaced very soon to avoid any service performance degradation and secondly, because it will appear as a failure to size the router specifications accurately as the router is currently overwhelmed. That also means that, in the opposite scenario, when that router is not running at 99%, there is a waste of available resource that could be useful somewhere else. Virtualization addresses that resource management. A device capable of virtualization can be seen as a consolidation of many virtual smaller devices, sharing the available pool of resource of the physical device. The pool of resource, allocated dynamically, consists in, but is not limited to, CPU, memory (RAM or Flash), interfaces, I/O slots, disk space.

The additional advantage of virtualization is the simpler creation of these virtual devices: this creation is reduced to the remote configuration of the physical device to enable a new virtual device assuming the wiring of the physical device is done accordingly in advance. The wiring of the physical device has to be planned in such a way that the incoming and outgoing connections to and from the physical device are also virtualized to reduce the configuration of the physical device interfaces to a simple set of commands sent remotely. Those skilled in the art would appreciate that 802.1q VLAN tagging described under the IEEE 802.1q standard is such a widely used technique to create many virtual links under a common physical LAN connection.

Figure 8:
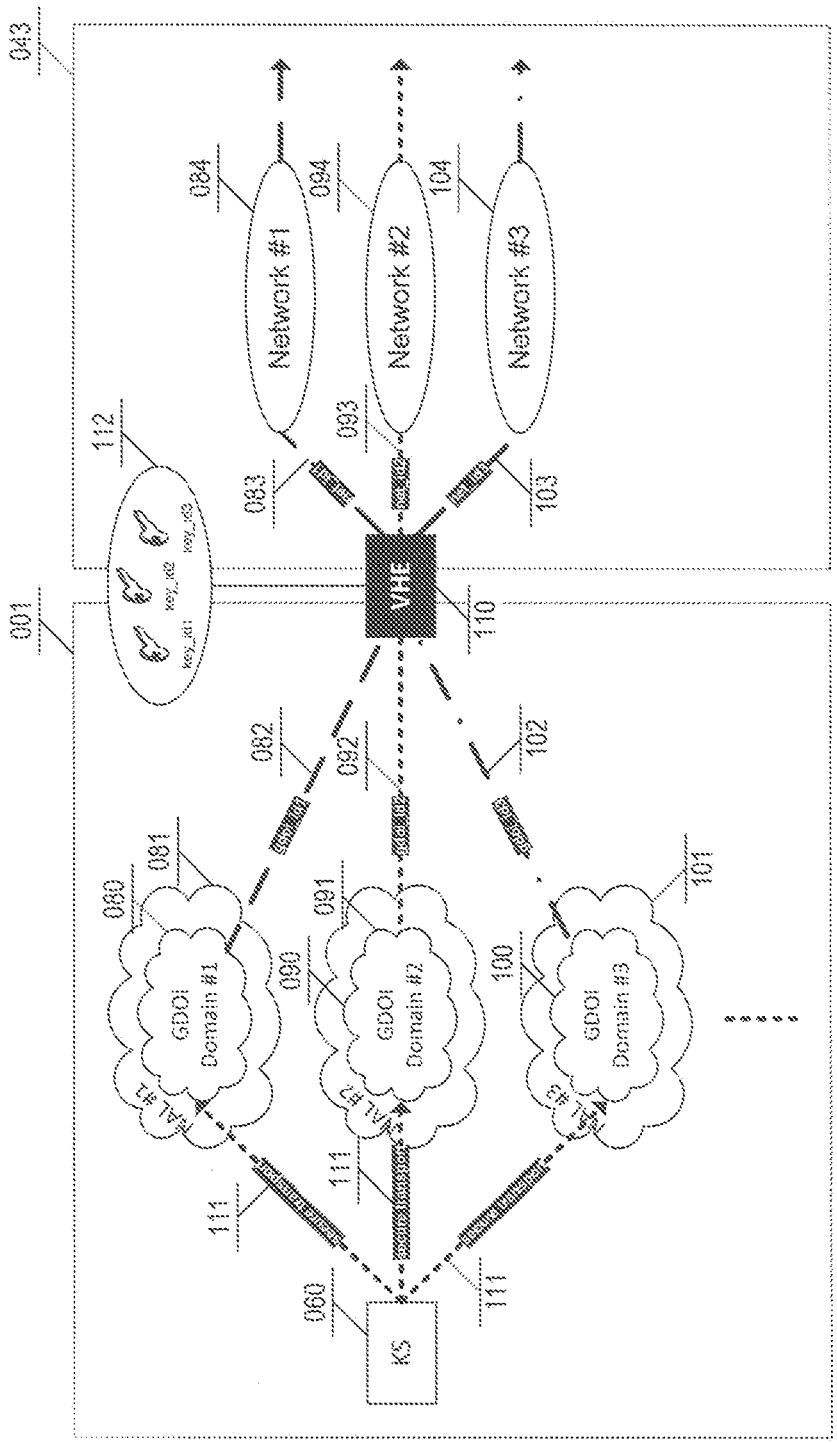
FIG. 8 is a network diagram showing further steps for building improved virtual private networks in accordance with the embodiments of the invention.

A VPN aggregator endpoint, also called a VPN head-end (VHE), is the intelligence of a VPN network, in charge of, but not limited to, the endpoint registrations, the distribution of the network routing to all the endpoints . . . . In one embodiment, as shown in FIG. 8, one physical VHE (110) is aggregating traffic from different GDOI domains to act as many virtual VHEs. For instance, a GDOI domain (080, 090, 100) built on top of an mGRE network (NAL) (081, 091, 101). All the members of this GDOI domain register (082, 092, 102) on the VHE (110), using their encryption key (112) securely received (111) by the KS (060). The traffic of all these members is encrypted/decrypted with that same encryption key by the VHE (110). The key is unique to the GDOI domain it is associated to. The VHE hands over (083, 093, 103) the traffic from the GDOI domain (080, 090, 100) to a dedicated network (084, 094, 104). Also, the same physical VHE also handles other GDOI domains, using the different encryption keys (112) accordingly: the different GDOI domains do not communicate with each other. Front Door Virtual Path Forwarding (fVRF) is one of the virtualization technique that can be used to achieve this. This is a virtualization technique. The VHE (110) is a physical endpoint separating the external side (001) with the internal side (043) of the network. The latter reside in a point of presence. Several VHEs can be deployed to ensure scalability and resiliency.

When virtualization is an advanced technique to aggregate several customers onto same physical equipments, it is only enforceable on local equipments. Even when a customer is willing to improve their user experience by converting their global VPN with unpredictable performance (as seen earlier when this global VPN includes inter-continental virtual tunnels over the public infrastructure) to regional VPNs, the latter needs to be connected together to build the global network. In one embodiment, a virtualized core stitches all regional VPNs together in order to extend the customer reach seamlessly. A service provider offering regional VPNs to his customers is able to build highly performing global VPN networks by getting regional VPNs connected to each other instantly resulting in a significantly reduced time of deployment and reduced costs. As the core is virtualized, only one physical infrastructure is required to transport all customers traffic. The virtualization techniques that can be used to build up the core are, but not limited to, Multiprotocol Label Switching (MPLS)-based networks including Layer 2 VPN (L2VPN) MPLS and Layer 3 VPN (L3VPN) MPLS, Virtual Private LAN Service (VPLS), Overlay Transport Virtualization (OTV), Frame-Relay, Encapsulating protocols like Generic Routing Encapsulation (GRE), Multipoint GRE (mGRE), 802.1q in 802.1q (Q-in-Q) 802.1ad protocol. As shown on FIG. 8bis, two VHEs (114, 115), each of them located in distinct points of presence (141, 142) located in different continent (145, 146) and a core network (143) getting them connected together (144). Every VHE (114, 115) can potentially be attached to the core (143) to allow a customer to build a global network. For each network created on a VHE, a virtual network is built up on the core to make it instantly extendable to other regions. On the VHE side, as shown on FIG. 8, the VHE has connections to the Internet (001) and connections to the core network (043). The virtualization process happens on the core side of the VHE. Each customer's NVL terminating on the VHE is being assigned a logical interface on the core side of the VHE, resulting in the entire customer's traffic to be handed over to the right customer's logical network in the core. For instance, the traffic (082) of GDOI domain (080) for a given customer, terminating on the VHE (110), will be handed over (083) to the right customer's logical network (084) on the core (043). On the core side, as shown on the FIG. 8bis, when a VPN network is built on the VHE (114) to reach other VPN network hosted on another VHE (115), the virtual network hand-off (083) is created on the VHE (114) internal physical interface (116). The latter (116) being connected on the core edge (147). The core edge (147) is a network equipment that is part of the core network (143) and responsible for managing the edge of the core network (143) or how the data flows enter or exit the core network. As the traffic (084) reaches the core edge (147), the traffic (086) then is sent over (144) the core (143) to the right destination (146). The core edge (148) hands over the traffic (088) to the right virtual interface (089) of the other VHE (115) via the physical interface (117). That demonstrates that two VPN networks created on two different VHEs (114, 115) can communicate with each other using the virtualized core network (143). In order to protect the control plane traffic, all the endpoints should enforce network Quality of Service (QoS). In routing, the control plane is the part of the router architecture that is concerned with handling the information in a (possibly augmented) routing table that defines what to do with incoming network traffic. Control plane logic also can define certain packets to get preferential treatment of certain packets for which a high quality of service (QoS) is defined by such mechanisms as differentiated services. These packets that are critical are, for instance, keepalive packets maintaining a communication channel between peers. Those skilled in the art should appreciate that, on a network where congestion does not occur, QoS will only be used to optimize the scheduling (queuing) process of the outgoing traffic of an endpoint. This paper describes how to build multiple virtualized GDOI domains on top of distinguished mGRE networks over the Internet on mutualized physical platforms.

Figure 9:
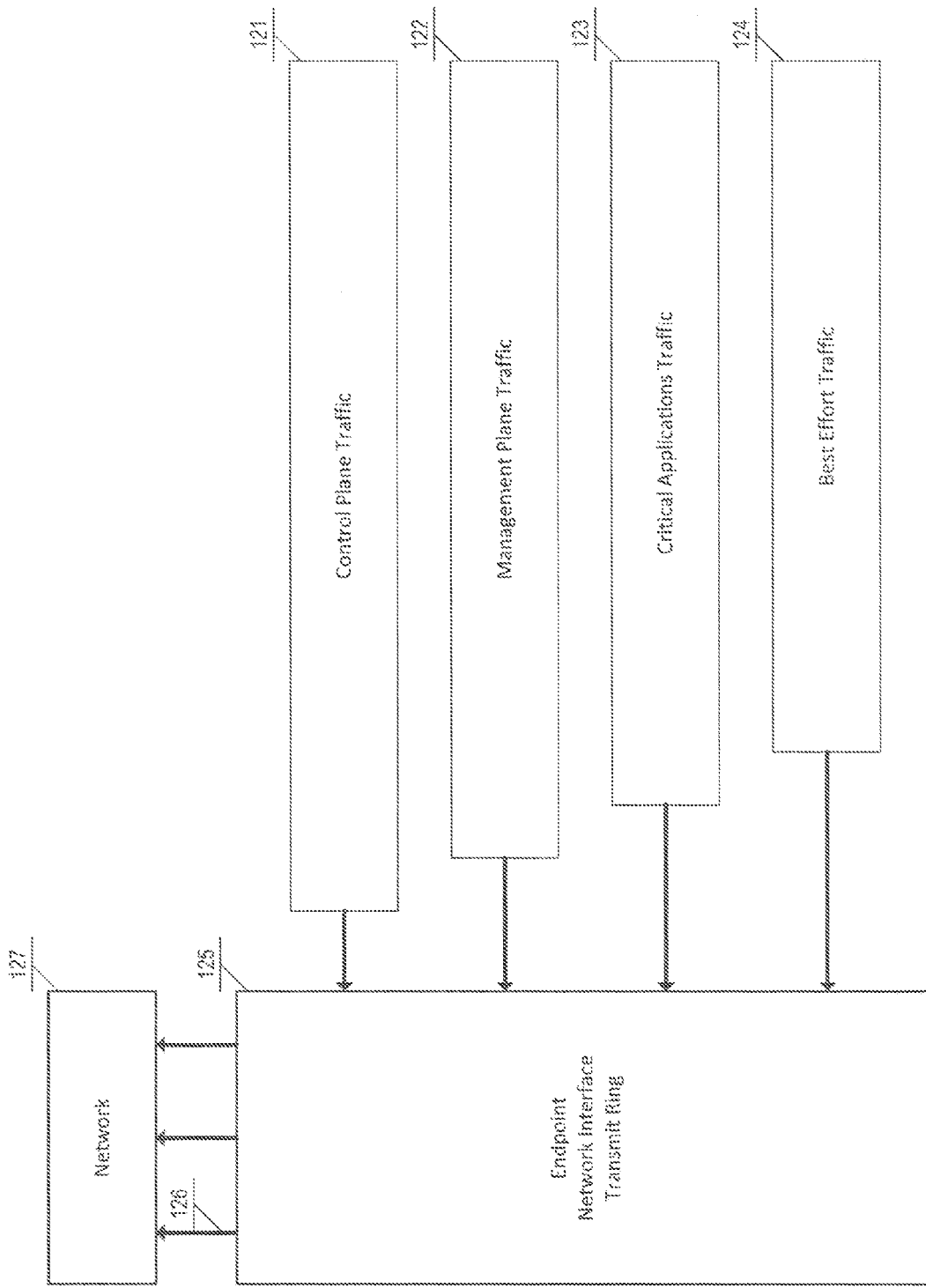
FIG. 9 is a network diagram illustrating further steps for building improved virtual private networks in accordance with the embodiments of the invention.

In one embodiment, the QoS engine running on each endpoint of these networks is enforcing advanced traffic management to control and optimized the data packets behavior over the last mile. The last mile is the circuit directly connected to an endpoint. Most of the congestion happens at that point. Once the traffic has reach the service provider's core network (at the other end of that circuit), there is unlikely to have bandwidth starvation occurring. As illustrated on FIG. 9, the traffic is classified in four categories: control plane (121), management plane (122), critical applications (123) and best effort (124). Part of this embodiment, the traffic is released from the endpoint in the following order: first the control plane traffic, then the management plane traffic, then the critical applications traffic then the best effort traffic. The control plane comprises of all the traffic that is necessary to keep the network up and running for both the NAL and NVL. Some examples of control plane traffic includes, but it not limited to, the GDOI key exchange traffic, the Internet Key Exchange (IKE) key exchange, the SCEP traffic for the X.509 certificate enrolment process, the IKE Dead Peer Detection (DPD) keepalive packets, the Bidirectional Forwarding Detection (BFD) traffic, the dynamic routing protocol exchanges, the IP SLA agent/responder traffic, the NHRP registration/notification/update traffic, the CRL publication traffic, any signaling traffic (in multimedia data flows like voice or video). The control plane traffic will be treated as the most important traffic, therefore processed accordingly by an endpoint: this traffic will be unleashed to the endpoint network interface transmit ring (125) first to be sent out to the network (127) before any other traffic. The traffic may be sent using connection (126). Those skilled in the art should appreciate that some of the control plane traffic will be ciphered. When available, a data packet pre-classification feature will be enabled on all endpoints where encryption occurs in order to their QoS engine to process the packets accordingly. The management plane comprises of all the traffic used to manage the endpoints. Some examples of management plane traffic includes, but it not limited to, Secure Shell (SSH), Secure Socket Layer (SSL)-based, Transport Layer Security (TLS)-based or Telnet protocol, Simple Network Management Protocol (SNMP) traffic, some of the Trivial File Transfer Protocol (TFTP), File Transfer Protocol (FTP) or Hyper Text Transfer Protocol (HTTP) traffics for firmware or code upgrades. The critical applications traffic comprises of all the network flow coming from important identified corporate applications. Some examples of critical applications traffic includes, but it not limited to, Enterprise Resource Planning (ERP) traffic, provisioning process traffic. All the traffic that has not been classified under either control plane or management plane or critical applications will be treated in a best effort manner.

On a network interface, scheduling (queuing) occurs. Each network interface queues up a certain amount of traffic before releasing it onto the network media. The controlling process of these queues is called "transmit ring". Once the transmit ring is full, the network packets in the buffers are sent onto the network. When the transmit ring waits to be filled up, some critical network packets might be delayed, affecting the network performance or worse, compromising the network stability. In one embodiment, the transmit ring queue length is tweaked in order to reduce the delay before network packets are released on the network media. For instance, on DSL ports, the default transmit ring queue length is set to 64 packets on most endpoints. On Ethernet interfaces, the default transmit ring queue length is set to 128 packets. Part of this embodiment, the transmit ring queue length is reduced to a very small value (below 5 packets). Those skilled in the art should appreciate that reducing the transmit ring queue size also overcomes the performance degradation introduced by oversubscription of DSL accesses.

In one embodiment, the provisioning process of endpoints is achieved in an unattended manner.

Figure 10:
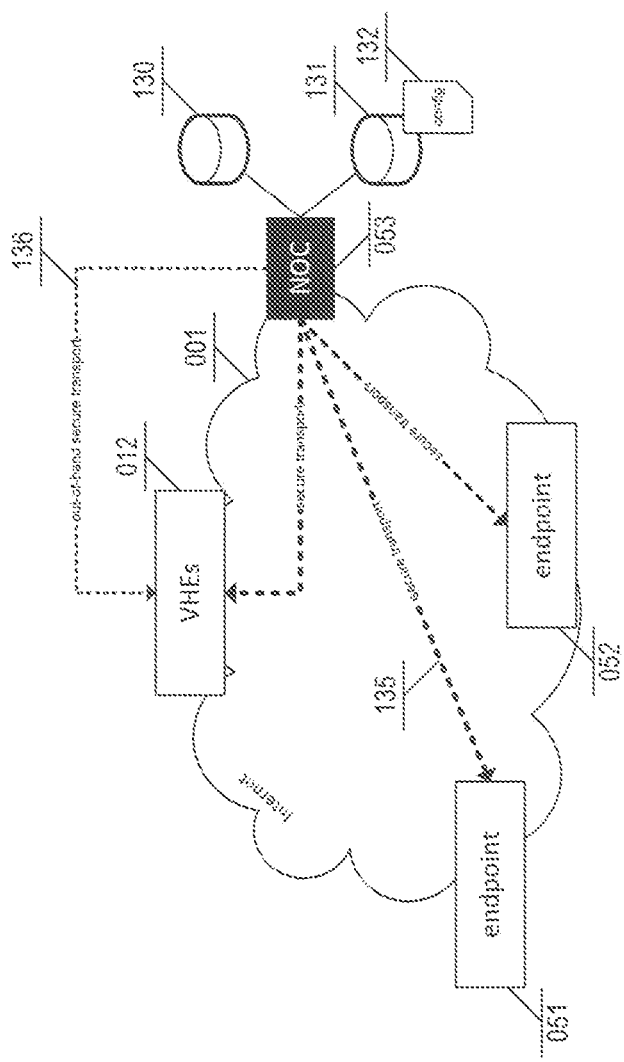
FIG. 10 is a network diagram illustrating further steps for building improved virtual private networks in accordance with the embodiments of the invention.

The provisioning process consists in two tasks: first task is to configure the VHE and the second task is to provision and configure the endpoints that will connect and register to the VHE. The VHE as described earlier in FIG. 8 is a very powerful endpoint handling different NVLs and NALs. All the network configuration aspect is based using virtualization capabilities of the VHE. All the configuration process consists in creating virtual instances of the available physical resource pool of the VHE. There is no extra physical wiring exercise to be done as all the wiring has been done in advanced. As no physical wiring is required, the provisioning process is reduced to send the configuration details to the VHE remotely. As shown on FIG. 10, facing the VHE, the endpoints that are installed on the other side of the network (051, 052), most likely in the customer's premises, have a provisioning process reduced to the minimum. The endpoints are deployed with a very simple configuration, also called bootstrap configuration. A bootstrap configuration is the minimum configuration required to get the endpoint (051, 052) connected to the network, in that case, the Internet (001). With this bootstrap configuration, the endpoint (051, 052) is remotely accessible by the automation engine (130, 131) that are in charge of "injecting" the complete device configuration. Then, the configurations (132) for both the VHE (012) and endpoints (051, 052) are generated and sent remotely (135) by automation engine (130, 131) sitting in the network operation centre (NOC) (053) as illustrated on FIG. 10. The automation engine comprise of a configuration engine (130) storing all endpoints details in a repository, an orchestrator generating the configurations (132) of the endpoints and delivery engines (131) sending configurations to endpoints (051, 052). The complete explanation of how the automation engine works is explained in Provisional Patent Application Ser. No. 61/121,127 filed Dec. 9, 2008, entitled "Remote VPN Device Automation Engine, incorporated herein by reference. Eventually, the remote configuration process for the VHEs can be achieved using an out-of-band management network (136) to increase the security of the configuration process. An out-of-band management network acts like a back door that can be used in case the in-band network fails.

Figure 11:
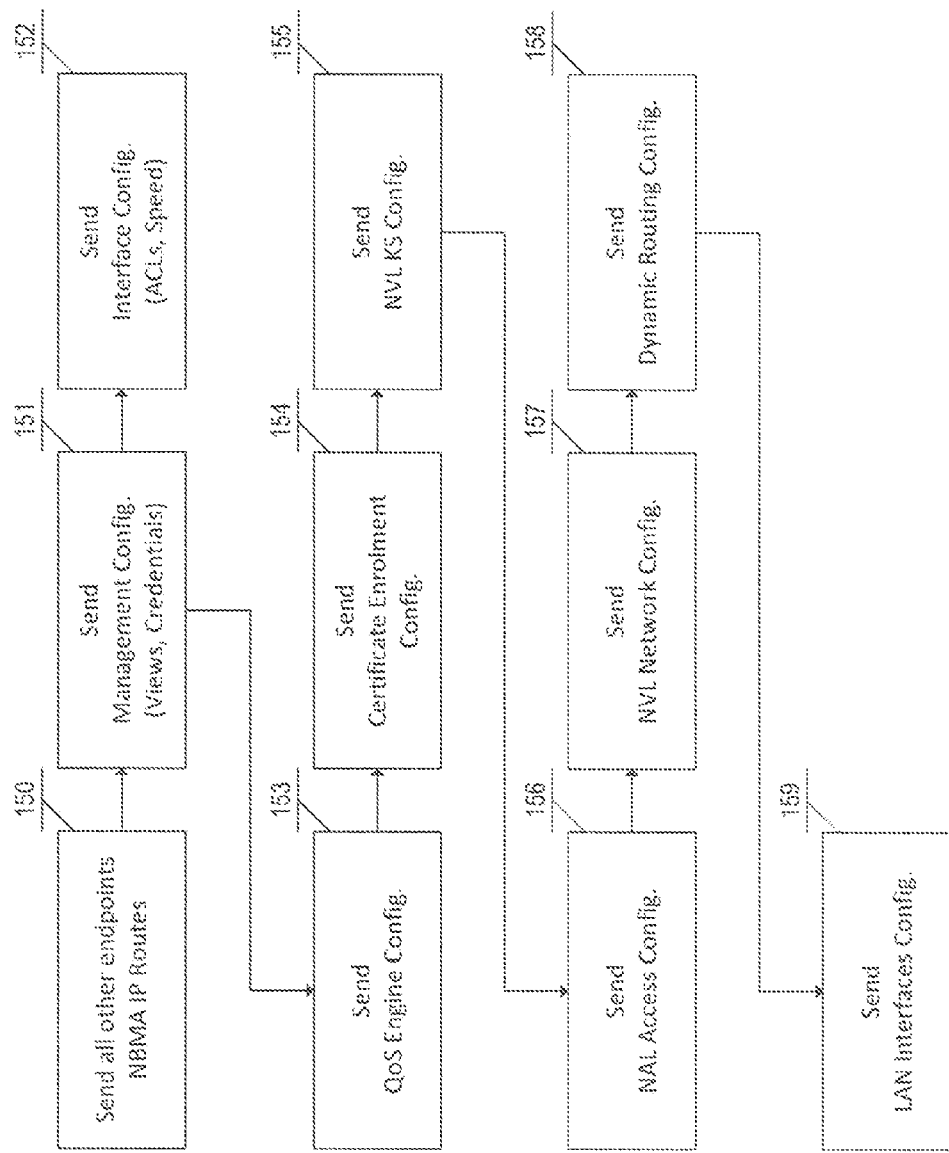
FIG. 11 is a network diagram illustrating further steps for building improved virtual private networks in accordance with the embodiments of the invention.

The FIG. 11 describes the remote configuration process of both VHEs and endpoints performed by the automation engine described earlier. All the NBMA IP addresses of the other existing endpoints of the network are sent (150) in the IP routing tables of the VHEs and endpoints to configure. An IP routing table is a database in a router that stores the routes to network destinations. These routes are required for the network traffic to reach a particular destination. When a router does not have sufficient routing information on a given destination, it relies on a default route, if present, that should lead to that particular unknown destination. The remote automation engine will never send a default route to the endpoints as a default route might need to be saved for some other applications and that there can be only one default route on an endpoint. The management configuration details are sent (151). They comprise of, but are not limited to, the administrator credentials (usernames, password and access level), views, logging details, reporting details. These are used for getting access to the endpoint and the latter to report all its activities. The interface ports configuration is added (152). This comprises of, but is not limited to, the interface names, interface speed, interface specific details (PVC, Tag, Label, MTU, TCP MSS . . . ), security settings (firewall, filters, ACLs) and interface hardware settings. These are used for connecting and securing the endpoint. The QoS engine configuration is added to the configuration (153). This comprises of, but is not limited to, the classification of the network packets, the transmit ring queue length, the network policer engine details, the network shaping engine details. These are used for improving the endpoint performance and deal with network congestion and bottlenecks. The X.509 certification enrolment configuration details are added to the configuration (154). This comprises of, but is not limited to, the root certificate string, the trustpoint IP address, the certificate request details (CN, O, OU, E), the lifetime of the certificate. These are used for authenticating the endpoints and prevent man-in-the-middle network attacks. The Network Virtualization Layer (NVL) Key Server (KS) details are added (155). This comprises of, but is not limited to, the KS IP addresses, the GDOI identity number. These are used for the endpoints to retrieve the encryption keys and get access to the right GDOI domain. Some extra KS configuration details are added the first time the KS is created for a new network. This comprises of, but is not limited to, rekey IP addresses, rekey retransmit delay, the GM authorization ACL, the IPSec security association details, the anti-replay strategy. These are used for securing the GDOI domain. The Network Abstraction Layer (NAL) access details are added (156). This comprises of, but is not limited to, the NHRP network details (ID, key, static entries, shortcut switching activation, routing engine changes), the GRE source interfaces or IP addresses, the GRE destination IP addresses, the QoS engine to use. These are used for the endpoints to get access to the NAL. The Network Virtualization Layer (NVL) network configuration is added (157). This comprises of, but is not limited to, the GDOI identity number, the KS IP addresses, the GDOI encryption details (ACLs, IPSec transform set). These are used for the endpoints to connect to their associated GDOI domain. The dynamic routing protocol is added to the configuration (158). This comprises of, but is not limited to, the routing protocol configuration used over the network, the interface costs, the Bidirectional Forwarding Detection (BFD) peers, the IP SLA agents. These are used for the endpoints to retrieve the dynamic routing information. Finally, the LAN interface configuration is sent. This comprises of, but is not limited to, the interface speeds, the interface cost, the interface specific settings (MTU, TCP MSS), the high availability protocol settings (VRRP, HSRP, GLBP). These are used for configuring the LAN-facing interface configuration (159) of the endpoints.

Using the teachings outlined in the above written description including its figures and also with the knowledge of the commercial hardware sued in the implementation of the network, one of skilled in the art can write scripting router configurations and configure the hardware and software as required to implement our solution.

Alternative Implementations

The processes of this patent can be implemented in a number of ways. The following are some, but not all, of the ways in which such processes can be carried out.

The processes can be carried out by a person keying instructions into a computer to provision a communication system to operate as disclosed herein. They can also be carried out by a system itself, and also by the interaction of a server and a client, or the interaction of endpoints peered with each other exchanging data packets. There is any number of such means for carrying out the processes.

Further, the processes can be implemented by an article of manufacture, such as a storage medium with the processes embedded thereon or therein in the form of computer instructions or otherwise. Such medium could be, without limitation, optical storage such as CD, DVD, Blu-Ray, or other such optical storage. A medium could also be flash memory-based storage. Such medium could contain a copy of programming instructions on internal computer memory during a download process or during an upload process. Further, the storage medium could be the memory of an integrated circuit, such memory having one or more of such processes stored thereon or therein.

In the foregoing specification, specific embodiments of the present invention have been described. However, one of the ordinary skills in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage or solution to occur or become more pronounced are not to be construed as a critical, required, or essential features or elements of any or all the claims. The invention is defined solely by the appended claims including any amendments made during the pendency of this application and all equivalents of those claims as issues.

What is claimed is:

1. A system for communication, comprising:
a network abstraction layer (NAL) built on a public Internet, the NAL comprising an overlay network allowing a direct Internet Protocol (IP) communication between endpoints in a virtual private network (VPN) over the Internet, wherein the NAL provides the overlay network between the endpoints, the overlay network being built over the Internet; and
a network virtualization layer (NVL) built on the NAL, the NVL comprising a VPN aggregator using a group key management encryption protocol providing synchronization of session keys to encrypt a payload between all the endpoints over the NAL such that encrypted traffic is able to be decrypted by any endpoint for an entire session to allow instantly available communication between all the endpoints, wherein the communication between all the endpoints does not require using a hub after an initial connection is established, and wherein the VPN aggregator enables aggregation of multiple encryption domains using virtualization techniques;
wherein an IP communication defines data being exchanged between the endpoints via tunnel interfaces, wherein a tunnel interface defines an interface on an endpoint that is one side of a point-to-point or point-to-multipoint link with another endpoint; and
wherein IP tunnel addresses define all IP addresses of the tunnel interfaces of an endpoint, wherein translation of the IP tunnel addresses and all LAN IP subnets of the endpoint interact IP address occurs for each endpoint, and wherein a registration process the IP addressing scheme of the each endpoint is recorded, said IP addressing scheme including public IP addresses and the IP tunnel addresses of the each endpoint and all LAN IP subnets of the each endpoint.

2. The system of claim 1, wherein the endpoints are configured to hand the communications over to a recipient in clear.

3. The system of claim 1, wherein the NVL is configured as an encryption layer on top of the NAL.

4. The system of claim 3, wherein the NVL is configured to encode and decode the communications.

5. The system of claim 1, wherein the protocol is a Group Domain of Interpretation (GDOI) protocol.

6. A method of communication, comprising:
performing processing associated with providing, with a network abstraction layer (NAL) built on a public Internet, the NAL comprising an overlay network, a direct Internet Protocol (IP) communication between endpoints in a virtual private network (VPN) over the Internet, wherein the NAL provides the overlay network between the endpoints, the overlay network being built over the Internet; and
performing processing associated with providing, with a network virtualization layer (NVL) built on the NAL, the NVL comprising a VPN aggregator using a group key management encryption protocol synchronization of session keys to encrypt a payload between all the endpoints over the NAL such that encrypted traffic is able to be decrypted by any endpoint for an entire session to allow instantly available communication between all the endpoints, wherein the communication between all the endpoints does not require using a hub after an initial connection is established, and wherein the VPN aggregator enables aggregation of multiple encryption domains using virtualization techniques;

wherein an IP communication defines data being exchanged between the endpoints via tunnel interfaces, wherein a tunnel interface defines an interface on an endpoint that is one side of a point-to-point or point-to-multipoint link with another endpoint; and wherein IP tunnel addresses define all IP addresses of the tunnel interfaces of an endpoint, wherein translation of the IP tunnel addresses and all LAN IP subnets of the endpoint interact IP address occurs for each endpoint, and wherein a registration process the IP addressing scheme of the each endpoint is recorded, said IP addressing scheme including public IP addresses and the IP tunnel addresses of the each endpoint and all LAN IP subnets of the each endpoint.

7. The method of claim 6, further comprising handing the communications over to a recipient in clear at the endpoints.

8. The method of claim 6, wherein the NVL is configured as an encryption layer on top of the NAL.

9. The method of claim 8, further comprising encoding and decoding, with the NVL, the communications.

10. The method of claim 6, wherein the protocol is a Group Domain of Interpretation (GDOI) protocol.

* * * * *